March 3, 1970     H. HYSMITH     3,498,400
BATTERY LOCKING MEANS
Filed Nov. 24, 1967
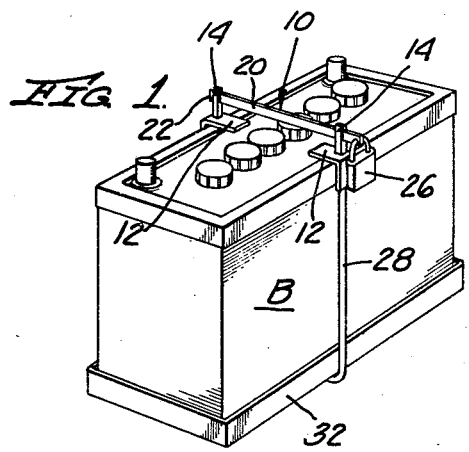
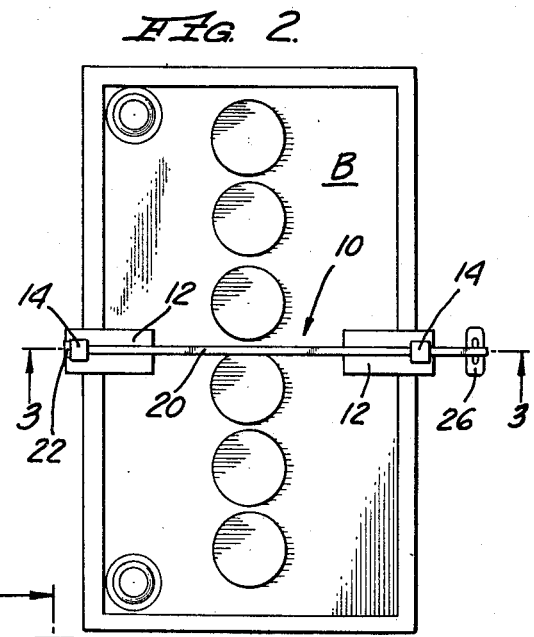
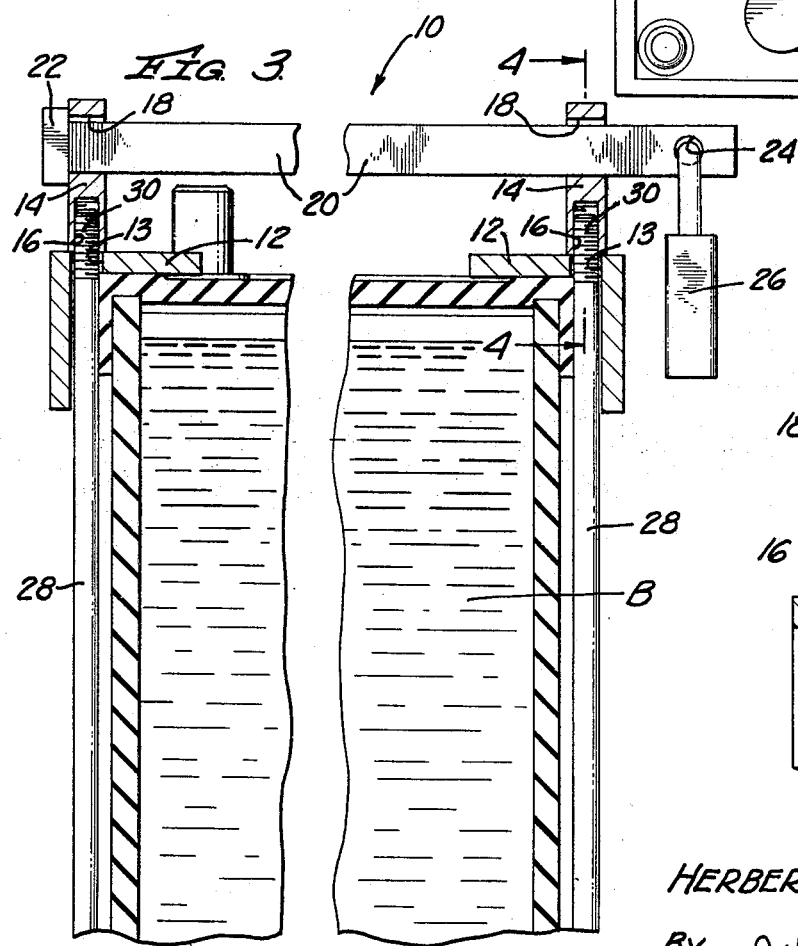
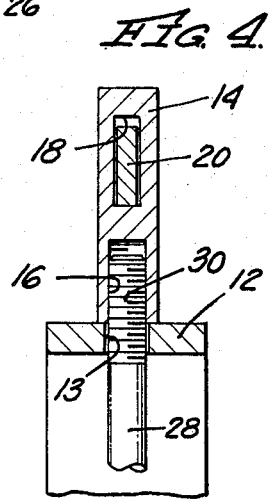
INVENTOR
HERBERT HYSMITH
BY John H. Crowe
AGENT

United States Patent Office 3,498,400
Patented Mar. 3, 1970

3,498,400
BATTERY LOCKING MEANS
Herbert Hysmith, 2722 Denton St.,
Riverside, Calif. 92507
Filed Nov. 24, 1967, Ser. No. 685,403
Int. Cl. B62d 25/00; E05b 17/00; F16b 41/00
U.S. Cl. 180—68.5
2 Claims

ABSTRACT OF THE DISCLOSURE

An apparatus for preventing the unwanted movement or theft of an automobile battery consisting of a pair of L-shaped clamp members with openings sized to admit a pair of holddown bolts positioned either side of the battery, a pair of posts with internal bores, and a crossbar. The clamps are designed to fit down around the holddown bolts and make clamping contact with the top edges of the battery, the posts to screw onto the bolts and hold the clamps in position, and the crossbar to fit through aligned openings in the posts where it can be secured against removal.

BACKGROUND OF THE INVENTION

This invention relates generally to means for securing an automobile battery in place in a car, and more particularly to such means designed to prevent theft of the battery from the car.

Typically, the storage battery of an automobile is maintained in its proper position in the engine compartment of the car, and restrained against movement while the car is in motion, by means of a tray, on which it rests, and associative tiedown hardware comprising a pair of holddown bolts, fastened at their lower ends to appropriate points of anchorage in the vicinity of the battery and extending upwardly adjacent the sides of the battery to a level above its top, and cooperating means hereinafter to be described.

The holddown bolts are positioned to flank the battery, generally halfway between its ends and can be straight, angled at their lower ends or otherwise shaped, depending upon the locations of their anchor points relative to the automobile battery position. The bolts are anchored at their lower ends in various ways to battery tray supporting means, brackets attached to engine compartment walls, or other appropriate fixtures sufficiently close to automobile batteries for the purpose, and they can be of the same or differing lengths, again depending upon the locations of their anchor points.

Battery holddown bolts are typically threaded at their upper ends for a reason soon appearing. These bolts are items of original equipment on conventional automobiles and familiar enough to anyone who has ever replaced a car battery to require no further description here. The holddown bolts serve in conjunction with the aforesaid cooperating means to firmly secure automobile batteries in place in the engine compartments of cars by providing downward pressure thereon, generally across the middles of their tops.

The above-mentioned cooperating means assumes different forms in different automobiles, quite often comprising a strap, or other elongate member, having openings in, or eyelet formations at, its ends of a size to receive a pair of battery holddown bolts in closely sliding relationship, and a pair of nuts. These parts are positioned for use by threading the holddown bolts adjacent a battery through the openings, or eyelets, at the ends of the elongate member; working the latter down on the bolts to contact with the top of the battery; and tightening the nuts against the ends of the elongate member on the threaded portions of said holddown bolts. While this results in effective restraint of the battery from shifting, or other unwanted movement, while the car is in motion, it generally affords little protection against theft of the battery when the car is parked in a public place, or, for that matter, anywhere else, including the owner's garage. Thus, if access to the battery area of the car is easy, a thief need only loosen the two nuts on the battery holddown bolts for quick and substantially noiseless effectuation of his larcenous intentions.

Besides its ineffectiveness for theft prevention, the above-described battery fastening means has a second shortcoming, namely, an inherent need for wrench-tightening adjustment during installation to assure its adequately retentive hold on the battery for prolonged periods under the constant vibrations to which the latter is subjected in use. While this might, on the surface, seem like a relatively minor fault, its ramifications go deep enough to give it a more serious dimension in that, as a result, assembly and disassembly of the involved hardware, particularly where rust and grime are present to make the work more difficult, become matters of more than passing simplicity, even, at times, requiring the services of skilled garage mechanics. The above-described battery fastening means, with its enumerated weaknesses (lack of theft resistance and requirement for wrench tightening), typifies, as previously indicated, the battery fastening hardware of the modern day automobile, no car manufacturer having as yet produced such hardware without the aforesaid weaknesses, at least insofar as I am aware.

SUMMARY OF THE INVENTION

The battery securing means of this invention consists of a relatively small number of simple and inexpensive parts designed to cooperate with battery holddown bolts of the above-described type in such manner as to form a clamping structure around the middle of the battery which can be locked to prevent theft of the latter. The battery securing means lends itself to quick and easy installation in any automobile by a technique requiring no tools and so simple that even a child can use it without difficulty. When so installed, the battery securing means serves the twofold purpose of protecting the battery against shifting, or other undesired movement, when the automobile is in motion and against theft when the car is parked.

The parts of the battery securing means are preferably made of a hard, tough metal maximumly resistant to hacksaw cutting, or other abusive treatment to which it might be subjected by a thief, a preferred metal being cold-rolled carbon-treated steel. The parts are, as previously indicated, of simple design, preferably consisting of a pair of L-shaped clamp members adapted to bear on the top edges of the battery; a pair of posts which screw onto the threaded ends of the battery holddown bolts; and a crossbar enlarged at one end and apertured near the other to receive the shackle of a padlock. The L-shaped clamp members are of identical size and shape, each having a pair of legs disposed at right angles. One of the legs of each clamp member has a perpendicular opening near where it is joined to the other leg, the opening being of such size as to slidingly accommodate a battery holddown bolt. The posts are likewise of identical size and shape, each having a bore tapped to receive the threaded upper end of a holddown bolt in threaded engagement and a transverse passageway through its upper portion. The passageway is sized to permit loosely sliding interfit of the crossbar up to, but no further than, its enlarged end.

The parts of my battery securing means are, as previously indicated, designed for cooperative use with battery holddown bolts and can be quickly and easily installed in any car, without the use of tools, by first slipping the L-shaped clamp members down around the holddown bolts stationed either side of the car's battery until one leg of each comes into contact with the top of the battery. It goes without saying that the battery and holddown bolts must be properly positioned, and the cooperating means of the battery tiedown hardware (as exemplified by the strap and nut means of previous reference) disassociated from the holddown bolts, before the L-shaped clamp members can be placed in the above-described positions.

The L-shaped clamp members should be so oriented when installed as described above that their apertured legs are flush with the top of the battery and their nonapertured legs depend vertically downwardly therefrom just outboard of the holddown bolts. When the clamp members are installed in this fashion, their apertured legs serve to prevent upward displacement of the battery from its proper position when the car on which it is installed is moving, and their downwardly depending legs, in a way subsequently made clear, prevent the swivelling or twisting of the apertured leg far enough toward the sides of the battery to permit removal of the latter from the car. It will be apparent, in view of the foregoing, that the L-shaped configuration of the clamp members contributes importantly to the above-mentioned ability of the battery securing means to protect the battery against theft.

After the L-shaped clamp members have been slipped down around the battery holddown bolts to their above-described positions, the two posts are screwed onto the latter until the passageways through their upper portions are aligned, preferably at the closest possible clearance, or tightest possible frictional contact, between their bottom ends and the clamp members. The crossbar is then threaded through the aligned passageways in the posts until the aperture near its leading end (that end opposite its enlarged end) passes through the second one of the two, at which point the enlarged end of the crossbar is adjacent the entrance to the passageway of the first post, being of such length as to make this possible. The shackle of a suitably sized padlock is next inserted through the aperture in the crossbar and the lock is snapped shut.

When the above-described parts of my battery securing means are assembled in the manner taught herein they form a relatively loose-jointed, but firm holding, clamping structure around the middle of the battery. The integrity of the clamping structure is preserved by the presence of a locked padlock on the crossbar and certain interlocking characteristics of its component parts, soon to be made clear. By virtue of these interlocking characteristics, the parts of the clamping structure remain locked together so long as the crossbar is confined to the passageways of the posts through which it passes (and the presence of the locked padlock on the crossbar, of course, keeps it so confined). To free the battery from the clamping structure, it is only necessary to unlock the padlock and remove it from the crossbar, then disassemble the parts of the structure by the reverse procedure of that described above. As in the case of its assembly, no tools are required for the disassembly of the clamping structure.

To briefly summarize, the battery securing means of this invention consists of a relatively few parts of simple construction and low cost which are uniquely designed to cooperate with existing automobile hardware in such a way as to form a self-locking clamping structure around any car battery and serve the two-fold purpose of securing the battery against shifting, bouncing, etc., movement when the car is in motion and protecting the battery against theft when the car is parked. The clamping structure is quickly and easily assembled without tools, from the parts of my battery securing means and the aforesaid automobile hardware. No tools are required for this assembly because the involved parts are designed to interlock into a cohesive whole without the need of any wrench, or other tool, inducement to that end. Disassembly of the clamping structure is as simple and easy a matter as its assembly and can likewise be perfored without the use of any tools.

It is thus a principal object of this invention to provide a simple and inexpensive means for securing the battery of an automobile against unwanted movement when the automobile is in motion and unauthorized removal when the car is parked.

It is another object of the invention to provide such means which can be quickly and easily installed in an automobile without the use of any tools.

Other objects, features, and advantages of the invention will become apparent in the light of subsequent disclosures herein.

BRIEF DESCRIPTION OF THE DRAWING

FIGURE 1 is a perspective view of an automobile storage battery positioned in a battery holding tray in the engine compartment of an automobile with a preferred embodiment of the battery securing means of this invention disposed protectively with respect thereto.

FIGURE 2 is an enlarged top view of the FIGURE 1 battery and battery securing means.

FIGURE 3 is a further enlarged, fragmentary view of the battery and battery securing means, taken mostly in section along line 3—3 of FIGURE 2.

FIGURE 4 is a still further enlarged view, mostly in section, of the battery securing means and upper portion of a battery holddown bolt to which it is fastened in the vehicle in which the battery is installed, taken along line 4—4 in FIGURE 3.

DESCRIPTION OF A PREFERRED EMBODIMENT

Considering now the drawing in greater detail, there is shown generally at 10 a preferred embodiment of the battery securing means of this invention (hereinafter referred to simply as battery lock 10) cooperatively connected with a pair of battery holddown bolts 28 in the engine compartment of a car to secure a battery B in place in a supporting tray 32 in the engine compartment and protect the battery against theft. The holddown bolts 28 form a part of the battery securing hardware of the car and are anchored at their lower ends in such fashion as to flank the battery about halfway between its ends and extend upwardly, in use, to a level somewhat higher than the top of the battery, the latter as best shown in FIGURE 3. The battery holddown bolts are threaded at their upper ends, as seen at 30 in FIGURES 3 and 4, to receive a pair of nuts suitable for restraining a strap, or similar member, designed to fit transversely across the top of a battery and cooperate with the bolts to hold the latter in its proper position in the car. Since, as will be seen, these latter items of hardware form no part of the battery securing means of this invention, they are not illustrated in the drawing. In this connection, as a matter of fact, my battery securing means can be thought of as a substitute for these hardware items which cooperates much more versatility with the battery holddown bolts to provide a greater degree of security and protection for the battery than do the latter. Furthermore, my battery securing means can be installed with much less effort than can the "strap and nut" hardware which it replaces, no wrench being required for installation of the former, whereas a wrench is obviously necessary for nut-tightening purposes in the case of the latter.

The structure supporting, and other environmental structure adjacent, a storage battery in the engine compartment of an automobile is so well known as to require no illustration in the drawing, and for this reason, plus the fact that such illustration would serve no useful teaching purpose insofar as my invention is concerned, has been largely omitted. In this connection, no attempt has been made to illustrate, in the drawing, the manner in which the lower ends of battery holddown bolts 28 are secured, since, as previously indicated, such bolts are commonly employed and their methods of attachment to anchoring structure in the engine compartments of automobiles are therefore well known.

Battery lock 10 has five cooperating parts, namely, a pair of L-shaped clamp members 12 of identical design, a pair of slotted posts 14, also of identical design, and a crossbar 20 having a head 22 at one end and a round, penetrative opening, or aperture, 24, near its other end. Each of the L-shaped clamp members has two legs disposed at right angles. One of the legs of each of the clamp members has a round opening 13 running perpendicularly through its middle, at its inner end, as best illustrated in FIGURES 3 and 4. The openings 13 in the clamp members are sized to admit holddown bolts 28 in loosely sliding relationship so that the members can be slipped downwardly around the bolts to flushness of the apertured leg of each against the top of battery B and downwardly depending disposition of the other leg outboard of the battery holddown bolt which passes through the clamp member, as best illustrated in FIGURE 3.

As will be evident from the previous teachings, clamp members 12, as a result of their unique shapes and the way in which they are locked into place in the assembled battery lock, serve as clamps to prevent escape of the battery from tray 32, as a result of bouncing, or other abnormal movement, of the car in motion, as well as removal of the battery from the car by a thief or other unauthorized person. In the latter connection, the vertically disposed legs of the clamp members provide stops which jam against the sides of the battery to prevent swivelling of the apertured legs of the clamp members around the battery holddown bolts far enough to permit an ingenious thief to work the battery out from under them. It is, of course, within the scope of my invention to vary the width of these members as desired, and they can easily be made sufficiently wide to eliminate any possibility of battery theft through such a swivelling, or twisting, procedure.

Posts 14 are of square cross section, as shown, although they can be of other than square cross-sectional configuration within the scope of this invention, and each has a blind bore 16 extending upwardly from its lower end, as seen in FIGURES 3 and 4, for something less than half of its length. The bore 16 is tapped to receive the threaded upper end of a battery holddown bolt 28 in screw-in engagement, again as seen in FIGURES 3 and 4. Each of the posts has a slot 18, sized to receive the crossbar 20 in loosely sliding relationship, in the upper portion of its body. The two slots are small enough to block entry of the head of the crossbar and thereby prevent continuing forward movement of the latter when its head comes even with the post in the manner shown in FIGURE 3.

The way the component parts of the battery lock 10 and holddown bolts 28 are put together to form the composite structure illustrated in the drawing will now, it is believed, be evident. The first step in the assembly is the positioning of L-shaped clamp members 12 with the apertured leg of each flat against the top of the battery, the other leg of each extending vertically downwardly therefrom and the battery holddown bolts projecting upwardly through the respective apertures in their legs disposed atop the battery. After this, posts 12 are screwed downwardly onto the holddown bolts until their slots 18 are aligned, either at the closest possible clearance, or actual frictional contact, between their lower ends and clamp members 12. While a wrench can be used if desired to make this adjustment, the adjustment is preferably made without a tool of any kind since the final battery lock-holddown bolt structure will remain intact, even though the connections between the posts and holddown bolts are relatively loose, because of the interlocking characteristics, previously referred to, of the component parts of the completed structure. As the final step of the here-involved assembly procedure, crossbar 20 is threaded through the aligned slots 18 in posts 14 until the aperture 24 at its front end passes through the second of the posts, after which the shackle of an open padlock 26 is passed through the aperture and the padlock is snapped shut.

FIGURES 1, 2 and 3 show the battery lock parts and holddown bolts interconnected in the above-described manner, and make it clear that the result is a fairly rigid clamping structure around the middle of the battery, which firmly secures the latter against accidental displacement or wrongful removal from its supporting tray. As will be apparent, the parts of the clamping structure are so interlocked as to impart a high degree of strength, durability and inflexibility thereto. To unlock the battery, it is only necessary to remove padlock 26 from crossbar 20, then reverse the above-described assembly procedure. Because of their small sizes, the various parts of the battery lock are light in weight, (even though made of a relatively heavy metal), and for this reason, plus the ease and simplicity with which they can be assembled, a car battery can be quickly locked against unwanted movement or theft with a minimum of skill and effort, even by a person with virtually no mechanical aptitude, through use of the lock as taught herein.

Certain permissible departures from the illustrated embodiment of my invention have been mentioned above and others will occur to those skilled in the art in the light of present teachings. Exemplary of the latter are non-critical variations of the shapes of various parts of the illustrated battery lock, the addition of useful, but non-critical, structural features to the battery lock, etc. A more specific example of such a modification of the illustrated battery lock would be the substitution of a crossbar with apertures for padlocks on both ends for its headed crossbar with an aperture in only one end.

I claim:

1. Battery securing means comprising:
   (a) a crossbar having a penetrative opening sized to freely admit the shackle of a padlock near at least one end;
   (b) a pair of clamp members, each having two segments meeting at an angle and a penetrative opening adapted to receive the upper end of a battery holddown bolt in slideable relationship so positioned as to permit downward movement of the clamp member around the holddown bolt in its upright position, with one segment substantially horizontally disposed and the other segment angled downwardly therefrom, to flushness of the horizontally disposed segment with the top of an automobile battery cooperatively positioned with respect to said holddown bolt, said clamp members being L-shaped and having the penetrative openings therein so located that positioning of said members with one segment of each flush against the top of said battery, in the above-indicated manner, results in the vertically downward dependency therefrom of its other segment in close adjacency to that side of one of said holddown bolts opposite its side adjacent said battery; and
   (c) a pair of post members, each having a tapped bored sized to threadedly engage the upper end of one of said battery holddown bolts extending from one end, and a laterally penetrative opening sized to receive the crossbar in slidable relationship;
   (d) the above-described parts being sized to permit the securing of an automobile battery in place in a car by slipping said clamp members downwardly around a pair of battery holddown bolts positioned either side of the battery to flushness of a horizantally disposed segment of each against the top of said battery; screwing said post members downwardly onto said bolts to bottom end adjacency, or contact, with the horizontally disposed segments of said clamp members and concurrent alignment of their laterally penetrative openings; and passing the crossbar through the openings in the posts until it is properly postioined for locking against removal by the passage of a padlock shackle through each penetrative opening therein and locking of said padlock; and so locking the crossbar against such removal.

2. The battery securing means of claim 1 in which the crossbar has only one penetrative opening sized to freely admit the shackle of said padlock and is characterized by the presence of a head at the end opposite that near which said penetrative opening occurs; and in which the laterally penetrative openings in said post members are sized to block entry of the head of said crossbar.

References Cited

UNITED STATES PATENTS

| 173,936 | 2/1876 | Fuller | 151—33 |
| 471,608 | 3/1892 | Gould | 151—33 |
| 2,869,663 | 1/1959 | McDevitt | 180—68.5 |

FOREIGN PATENTS 25,058   1912   Great Britain.

LEO FRIAGLIA, Primary Examiner

M. L. SMITH, Assistant Examiner

U.S. Cl. X.R.

70—14, 230, 258